Patented Oct. 1, 1935

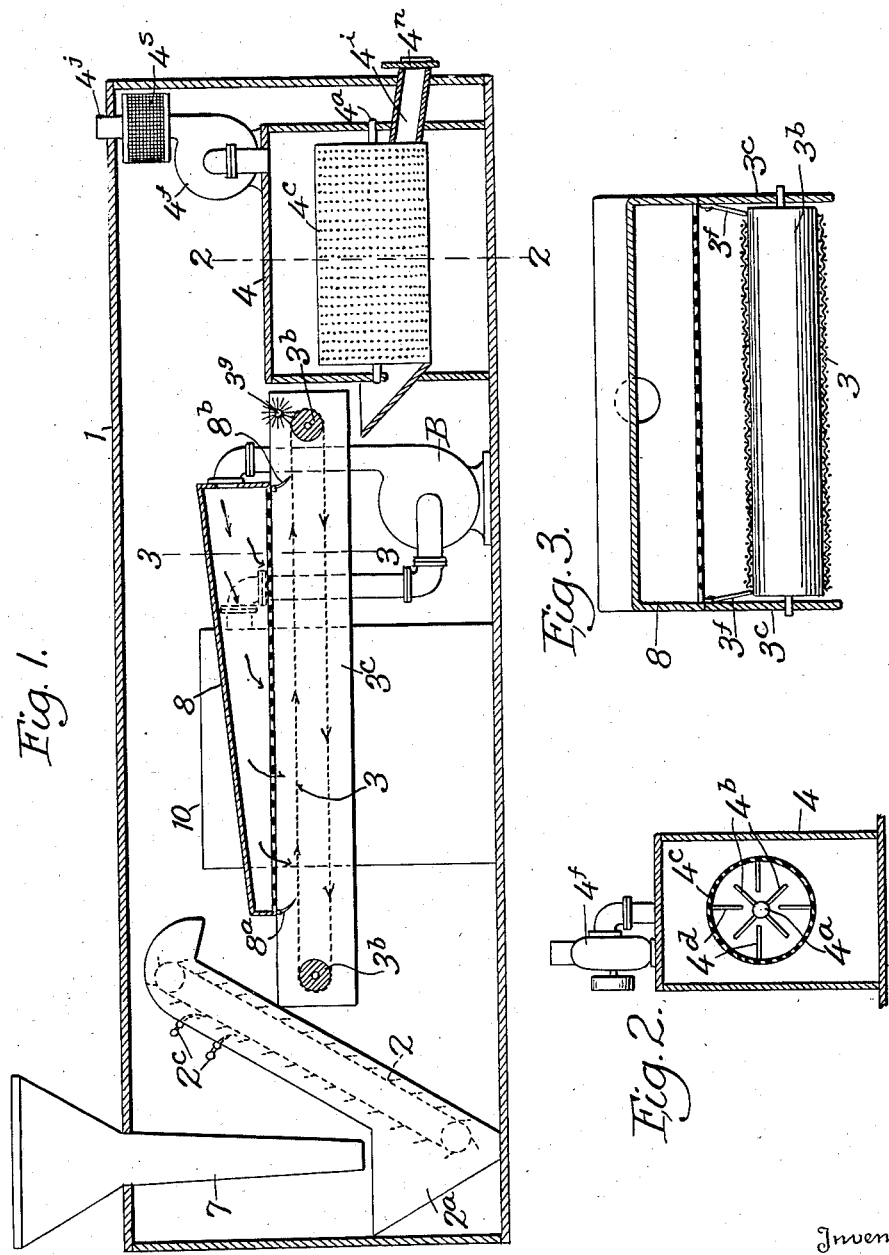

2,015,894

UNITED STATES PATENT OFFICE 2,015,894

APPARATUS FOR REMOVING EXTRANEOUS MATTERS FROM WOOL

Robert Mills Greenleaf, Los Angeles, Calif., assignor to Frosted Wool Process Company, a corporation of Nevada Application July 25, 1932, Serial No. 624,619

12 Claims. (Cl. 19—66)

This invention is a novel apparatus for use in processes of drying, degreasing, and cleaning wool as described in Greenleaf Patent No. 1,866,205 dated July 5, 1932. The present application has particular reference to the apparatus whereby extraneous foreign matters (such as water, grease, chaff, tar, paint, etc.) on or adhering to the wool fibres is frozen and thereafter separated from the fibres by mechanical agitation.

I will explain the invention with reference to the accompanying drawings which illustrate diagrammatically and conventionally apparatus for operating on washed or moistened wool to freeze or solidify the extraneous foreign matters adhering to the wool fibres. and separate the same therefrom and an understanding of which will enable others to readily construct and use the apparatus for the purpose stated. Following the description the essentials of the invention and novel construction and novel arrangement and combination of parts for which I desire protection are summarized in the claims.

In said drawings:—

Fig. 1 is a diagrammatic part longitudinal section of the present preferred form of apparatus embodying the invention.

Fig. 2 is a detail section on line 2—2, Fig. 1.

Fig. 3 is a detail section on line 3—3, Fig. 1.

Figure 4:
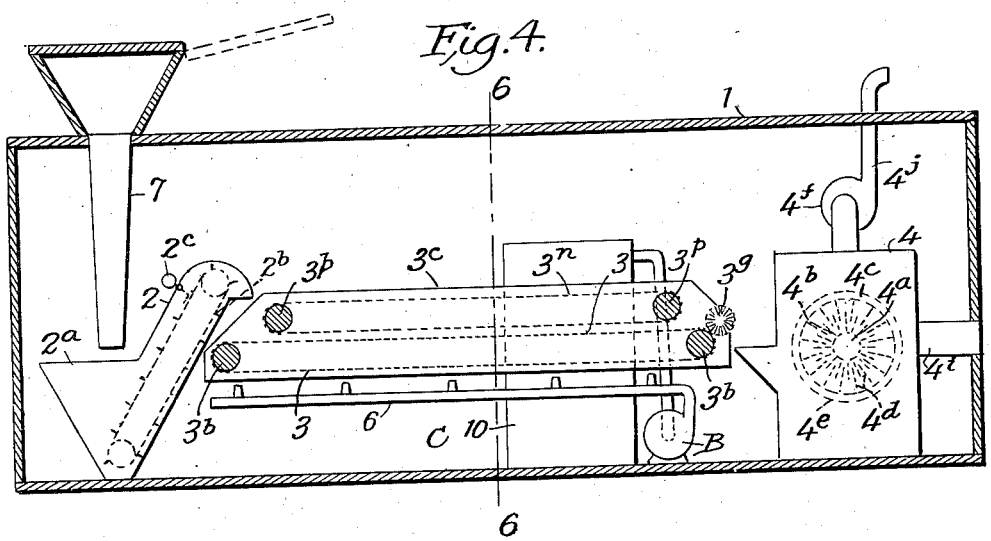
Fig. 4 is a diagrammatical longitudinal view partly in section of another apparatus embodying the invention.

Raw wool, as sheared from sheep, contains more or less grease, vegetable and other extraneous foreign solid matters such as water, grease, burrs, chaff, etc., clinging to the wool fibres and which have to be removed before the wool can be utilized in the mills. Ordinarily the raw wool is sorted, and then passed through a so-called "Grease wool duster" to free it from loose dirt, sand and other easily separable impurities: then it is washed in one or more baths, then rinsed in clear water, and the surplus free water removed by centrifuging or by squeeze rolls leaving the washed wool and foreign matters therein moist.

Heretofore such wool has been dried in a heated drier and if it contains extraneous foreign matters it is passed through so-called mechanical "burr pickers" to remove impurities, or where the wool contains a large percentage of foreign matters, such as burrs, etc. it has been treated with a chemical or acid bath and then subjected to heat sufficient to carbonize such foreign matters.

In my invention the washed wool and foreign matters while moist are introduced into a cleaning apparatus which comprises a freezing chamber 1 which is maintained at very low temperature, a wool feeder and opener; a traveling conveyor or belt 3, and a beater 4 or picker 5, or both, the opener, conveyor and beater and/or picker being preferably all arranged within the freezing chamber.

The moist wool is fed into the opener and thereby thoroughly opened up and fed in a thin layer or sheet onto the conveyor, whereon the wool may be agitated by air blasts and the extraneous foreign matters on the wool fibres frozen by the cold. The refrigerated fibres are then discharged from the conveyor into the duster or picker; or in some instances it may be passed successively through the beater and picker as hereinafter described.

The freezing chamber 1 may be of any suitable construction or size, and may be refrigerated by any suitable means to maintain a very low temperature therein (preferably about zero degrees F.). Such refrigeration could be produced either by an arrangement of freezing coils in the chamber or by introducing cold air thereinto from an exterior air refrigerating apparatus of any suitable type not shown. Such being well-known it is not necessary to describe or illustrate same herein.

The opener and feeding device 2 is preferably of the type of automatic feeder made by Sargent's Sons of Graniteville, Massachusetts, which is well-known to those skilled in the art. Such feeders comprise a hopper 2a into which the wet wool is deposited and an elevator belt 2b provided with pins which elevate the wool from the hopper and discharge it at its upper end and so-called rockers 2c at the upper end of the belt which comb the wool so as to open up the more or less matted moist wool so that the moisture and foreign matters can be frozen readily. The wool on the conveyor can be agitated by jets of cold air, and the frozen foreign matters on the wool fibres can be readily detached therefrom when the wool passes into the mechanical cleaner hereinafter referred to. The moist wool could be dropped into the hopper of the opener through a chute 7 or supplied thereto in any preferred manner.

The conveyor 3 is disposed in the freezing chamber below the discharging end of the opener, and preferably comprises an endless reticulated or woven wire belt 3 running over rolls 3b. The length and width of the conveyor would depend upon the capacity required; ordinarily it would be from 3 feet to 6 feet in width and from 10 to 50 feet in length. The rollers 3b are driven, and preferably a variable speed control is employed to vary the speed of the conveyor; as the time required for freezing the moisture and foreign matters on the wool fibres will vary somewhat with different wools, and with the amount of foreign matters to be frozen and the character of such foreign matters. Many such variable speed driving devices are well-known, and it is not necessary to illustrate or describe same herein.

Preferably, as shown in Fig. 1, a hood 8 is arranged above the conveyor 3, and perforated or suitably formed on its underside to discharge jets of air downwardly onto the upper run of the conveyor. Very cold air is discharged into this hood from a fan by a blower B, an inlet of which is connected with the discharge of an air refrigerating apparatus 10 which may be of any suitable construction adapted to reduce the air passing therethrough to a very low temperature. This air refrigerator is preferably placed within the chamber 1, and the air in the chamber is circulated therein. The hood 8 may be provided with flaps 8a and 8b at its ends to prevent escape of air at the ends of the hoods, the object being to pass air through the layer of wool on the upper run of the conveyor. Side boards 3c may be provided extending along the edge of the conveyor to confine the air discharged from the hood on top thereof, and to prevent the wool spilling off the sides of the conveyor flaps 3f may be provided, as indicated in Fig. 3.

Figure 5:
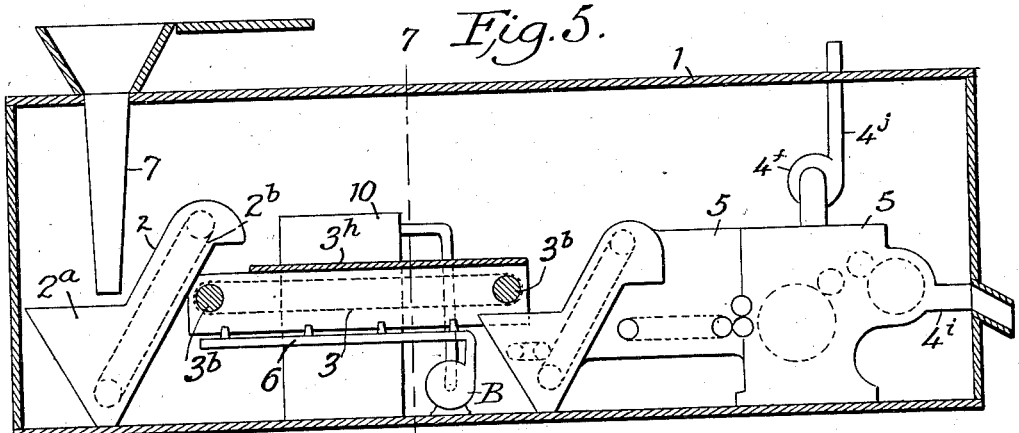
Fig. 5 is a similar view of a modification of the apparatus.
Figure 6:
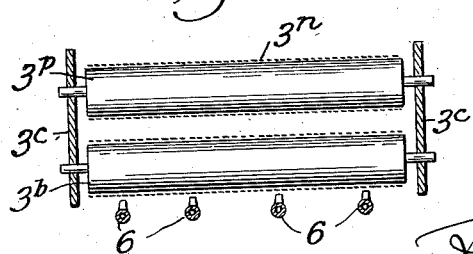
Fig. 6 is a detail transverse section through the conveyor on the line 6—6, Fig. 4.
Figure 7:
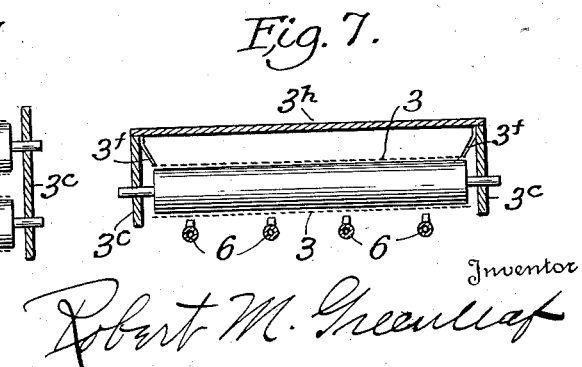
Fig. 7 is a similar section on the line 7—7, Fig. 5.

As shown in Fig. 4, instead of the hood 8 an endless belt 3n may be arranged above the conveyor as indicated in Figs. 4 and 6, belt 3n running over rollers 3p. The adjacent runs of the conveyor 3 and belt 3n are parallel and the wool passes therebetween. In lieu of belt 3n a hood 3h might be employed as indicated in Figs. 5 and 7. The belt 3n or hood 3h would be useful where jets of air are blown upwardly through the conveyor 3.

The blast of air should be regulable and where the vegetable matters on the wool are very finely divided should be light. The foreign matters should not be dried out or have the ice removed after being frozen as the dry finely divided vegetable matter should have the benefit of the adhering ice to give it added weight.

There may be a tendency for the wool in freezing on the conveyor to adhere to it therefore at the discharge end of the conveyor there may be mounted a rotary brush 3g, or other device, to detach any adhering wool from the conveyor.

As shown in Figs. 1 and 4, the conveyor discharges the refrigerated wool into a dusting or beating machine 4 of any suitable construction. The dusting machine 4 indicated in Figs. 1, 2 and 4 has a revolving shaft 4a provided with pins 4b radiating from the shaft. The shaft revolves in a barrel 4c in the interior of which are mounted radial pins 4d that interspace with the pins on the revolving shaft. The barrel is perforated so that the foreign frozen matters detached from the wool fibres can pass therethrough when the shaft is revolved. The speed of the revolving shaft, the size and spacing of the pins, the mesh of the screen and the velocity of the air through the fan will depend upon the condition and type of wool to be treated.

A fan 4f is usually mounted on top of the duster to remove through the screen any dust that is thrown loose when the shaft revolves. The discharge from this fan usually passes through a screen or air filter 4s within the freezing chamber, but it may be conducted outside the chamber 1 by means of a pipe 4j. The larger particles of frozen vegetable matter are thrown out by centrifugal force, pass through the screen 4c and may be discharged into the chamber. The smaller particles and some ice particles detached from the wool fibres will be drawn off as dust by the fan 4f. The wool is discharged through the opening 4i which is controlled by a suitable gate 4n. The dusting machine may if desired be provided with an automatic feeding and discharge control so as to retain the wool in the duster for a fixed number of revolutions. With certain types of wools it may be desirable to have two or more dusters in a row, one feeding into another, so as to most efficiently remove the various sizes of foreign matter with the least damage to the fibres.

The moisture in and adhering to the foreign matters is frozen and the foreign matters are encased partly or wholly in ice or filled with ice and rendered stiff and hard so that when struck by the revolving pins in the duster the foreign matters will be torn away from the wool and thrown out, and as they break away without disintegration the wool is left exceptionally clean and free from impurities upon completion of the dusting operation.

Some grades of wool can be completely cleaned by the dusting machine or machines, and the wool discharged from the freezing chamber will be clean wool ready for the normal processing for use in the manufacture of woolen or worsted products.

Where wool contains much extraneous foreign matters such as burrs, chaff, etc. a "burr-picker" 5 (Fig. 5) may be used in place of the dusting machine or in addition to the dusting machine. This burr picker may be of any suitable construction. I preferably use what is known as the Sargent burr picker, which combs the wool fibres parallel with their line of travel through the machine into a continuous thin and distended sheet or layer, and then subjects such layer to combers or beaters, revolving at a high rate of speed, that knock off the frozen burrs and other foreign particles adhering to the wool. The burr picker being well-known needs no detailed illustration or description herein.

If the wool contained no foreign matter other than burrs, as might be the case with certain pulled wools, the burr picker alone might be used.

The dusting machine alone may not remove all the burrs in certain types of wools and it may be necessary to use the burr picker also. Therefore in some cases both duster and picker, one or more of each, may be placed in the refrigerating chamber and the wool successively passed therethrough before being discharged. The wool may pass through the burr picker first and then through the duster, or it may be passed through a dusting machine both before and after going through the burr picker. If it is not dusted after burr picking, the wool will be removed from the freezing chamber from the burr picker, and will then be ready for the normal processing for the manufacture of woolen or worsted products.

When the wool is discharged from the freezing chamber it usually contains from thirty to forty percent of moisture and it may be necessary to dry it if it is to be stored or used in some process where this amount of moisture is objectionable. The dusting machine alone is not sufficient to take all the moisture off because the wool cannot be left in it too long or it will be materially damaged, but the agitation it receives on the belt from the blasts of air will not damage the fibres.

In some cases the opener belt might be extended sufficiently to permit the freezing to be effected thereon and the refrigerated wool delivered direct from the opener belt to the duster. This might also be possible if a lower temperature was used, or the opener operated at a slower speed, and the foreign matters in the wool of small size, or where two or more of the above conditions exist.

Where the conveyor discharges into a dusting machine of the batch type, i. e., operating intermittently, some means such as a hopper with a feed device should be interposed between the conveyor and the inlet into the duster, so that the conveyor or freezing belt can operate continuously and a batch of material accumulated and fed into the dusting machine in accordance with the intermittent operation thereof.

I claim:—

1. Apparatus for the purpose specified; comprising a refrigerating chamber, an endless conveyor in the chamber, means in the chamber for opening up wool containing extraneous foreign matters which can be frozen and distributing the wool upon the conveyor, means for freezing the foreign matters in the wool on the conveyor, and means in the chamber for separating the frozen foreign matters from the wool fibres.

2. Apparatus of the character specified; comprising a refrigerating chamber, means in the chamber for opening up and distributing wool containing extraneous foreign matters which can be frozen, an endless conveyor in the chamber receiving wool from the opener, the wool being retained on the conveyor until the foreign matters are frozen, and means for separating the extraneous frozen foreign matters on the wool fibres therefrom.

3. Apparatus of the character specified; comprising a refrigerating chamber, an endless conveyor in the chamber, means for opening up wool containing extraneous foreign matters which can be frozen and distributing the wool upon the conveyor, means for directing cold air onto the wool on the conveyor to freeze the extraneous foreign matters adhering to the wool, and means into which the conveyor discharges the refrigerated wool and whereby the extraneous frozen foreign matters will be separated from the wool.

4. Apparatus for the purpose specified; comprising a refrigerating chamber, a conveyor therein, means for opening up and distributing onto the conveyor wool containing extraneous foreign matters which can be frozen; means for directing jets of refrigerated air downwardly through the layer of wool on the conveyor to freeze the extraneous matters on the wool fibres, and means for separating the frozen foreign matters from the wool.

5. In apparatus of the character specified; a refrigerating chamber, an endless conveyor in the chamber, means in the chamber for opening up and distributing onto the conveyor wool containing extraneous foreign matters which can be frozen, means in the chamber for directing jets of refrigerated air downwardly through the layer of wool on the conveyor, means for retaining the wool upon the conveyor during its travel thereon; and means in the chamber into which the conveyor discharges the refrigerated wool and by which the frozen foreign matters on the wool are separated therefrom.

6. Apparatus for treating wool; comprising a refrigerating chamber, a conveyor in said chamber, means for feeding onto the conveyor wool containing extraneous foreign matters, means whereby the wool is subjected while in the chamber to a low temperature sufficient to freeze the extraneous matters on the wool; refrigerated means for mechanically separating the extraneous matters from the wool while they are in frozen condition and separately discharging the separated extraneous matters and the cleaned wool.

7. Apparatus for treating wool; comprising a refrigerating chamber, a conveyor in said chamber, means in said chamber for feeding onto the conveyor wool containing extraneous foreign matters, means whereby the wool is subjected while in the chamber to a low temperature sufficient to freeze the extraneous matters on the wool; and means in the chamber for mechanically separating the extraneous matters from the wool while they are in frozen condition and separately discharging the separated extraneous matters and the cleaned wool.

8. Apparatus for cleaning wool and related animal fibres, comprising a refrigerating chamber, means in the chamber for freezing the wool by circulating refrigerated gases therethrough, means for feeding wool to said refrigerating means, refrigerated means for separating the frozen extraneous matters from the refrigerated wool, and means for directing wool from the refrigerating means into said separating means without exposing the same to non-freezing temperatures.

9. Apparatus for the purpose specified; comprising a chamber, a conveyor therein, means for feeding onto the conveyor wool containing extraneous foreign matters which can be frozen, means for producing a low temperature in the chamber sufficient to freeze the extraneous foreign matters on the wool fibres while on the conveyor, and refrigerated means for separating the said foreign matters from the wool while it is in refrigerated condition.

10. Apparatus for cleaning wool and related animal fibres, comprising a refrigerated chamber, means for feeding wool or animal fibres into such chamber, means for moving the fibres through the chamber, the foreign extraneous matters on the animal fibres being frozen while being moved through the chamber, refrigerated mechanical means for separating the frozen extraneous foreign matters from the fibres while in frozen condition, and means for discharging the cleaned fibres separated from the extraneous matters.

11. Apparatus for cleaning wool and related animal fibres, comprising a chamber, means for passing through the chamber wool containing extraneous foreign matters, means for producing a low temperature in the chamber sufficient to freeze the extraneous foreign matters on the wool fibres; and refrigerated means for separating the said foreign matters from the wool while it is in refrigerated condition.

12. Apparatus for cleaning wool and related animal fibres, comprising a chamber, means for feeding wool into such chamber, means for passing the wool through the chamber, means for freezing the extraneous foreign matters on the wool while it is being moved through the chamber, refrigerated mechanical means for separating the frozen extraneous foreign matters from the fibres, and means for separately discharging the cleaned wool and the extraneous matters separated therefrom.

ROBERT MILLS GREENLEAF.